United States Patent [19]
Joglekar et al.

[11] Patent Number: 5,247,565
[45] Date of Patent: Sep. 21, 1993

[54] CELLULAR TELEPHONE WITH KEYPAD CONTROLLER

[75] Inventors: Manohar A. Joglekar, Long Grove; Philip F. Aseltine, Arlington Heights, both of Ill.

[73] Assignee: Motorola, Inc., Schaumburg, Ill.

[21] Appl. No.: 779,787

[22] Filed: Oct. 21, 1991

Related U.S. Application Data

[63] Continuation-in-part of Ser. No. 622,201, Nov. 27, 1990, Pat. No. 5,117,450, which is a continuation of Ser. No. 369,419, Jun. 20, 1989, abandoned, which is a continuation-in-part of Ser. No. 349,619, May 10, 1989, abandoned.

[51] Int. Cl.⁵ .................................................. H04M 11/00
[52] U.S. Cl. ........................................ 379/58; 379/63; 379/355
[58] Field of Search ................. 579/58, 59, 60, 61, 579/63, 355, 356

[56] References Cited

U.S. PATENT DOCUMENTS

| | | | |
|---|---|---|---|
| 4,658,096 | 4/1987 | West, Jr. | 379/59 |
| 4,718,080 | 1/1988 | Serrano et al. | 379/59 |
| 4,737,975 | 4/1988 | Shafer | 379/58 |
| 4,745,632 | 5/1988 | Duffy | 379/58 |
| 4,775,997 | 10/1988 | West, Jr. | 379/58 |
| 4,972,459 | 11/1990 | Toki et al. | 379/58 |
| 5,086,452 | 2/1992 | Ito et al. | 379/58 |
| 5,117,450 | 5/1992 | Joglekar et al. | 379/59 X |
| 5,148,471 | 9/1992 | Metroka et al. | 379/58 |

OTHER PUBLICATIONS

Motorola Instruction Manual No. 1S-SP134682.
Motorola Instruction Manual No. 68P81071E30.
The Celjack Owners Manual by Telular Inc.
"Description and Specification GNTA Payphone Type AY4 (NMT) for Connection to a Mobile Radiostation in Accordance with the Specifications for the Nordic Mobile Telephone Systems (NMT)".

*Primary Examiner*—James L. Dwyer
*Assistant Examiner*—M. Shehata
*Attorney, Agent, or Firm*—Kenneth W. Bolvin

[57] ABSTRACT

A unique cellular telephone (500) includes audio circuit 502, microcomputer (508), indicators (506) and (507), cellular telephone transceiver (519), and keypad controller (504) for controlling the operating modes thereof and automatically placing and receiving cellular telephone calls dialed in any pattern. The keypad includes numerical keys (0-9, # and *) and function keys (MEM and END/CLEAR) for entering digits of telephone number and key sequences for selecting operating modes. Power is applied to the cellular telephone transceiver (519) in response to concurrent activation of at least two keys. Each telephone number digit is detected and accumulated by microcomputer (508) and, after a pause of four seconds, the accumulated digits are sent via a data bus (511) to cellular telephone transceiver (519) for placing a telephone call. The call is subsequently terminated when the END key is activated or an END command is received by the cellular telephone transceiver (519). Thereafter, power to the cellular telephone transceiver (519) may be turned off in response to activation of the MEM-END key sequence.

15 Claims, 4 Drawing Sheets

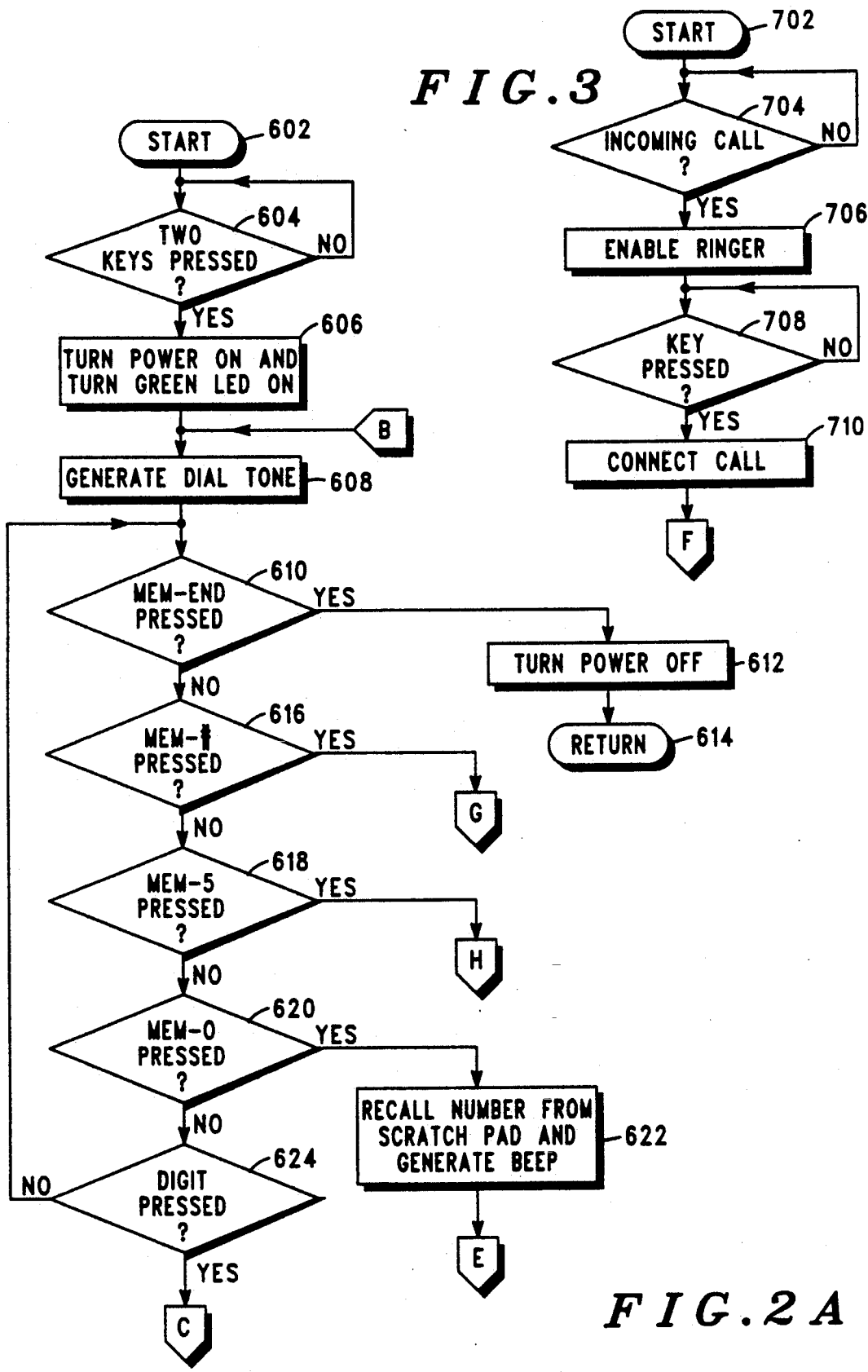

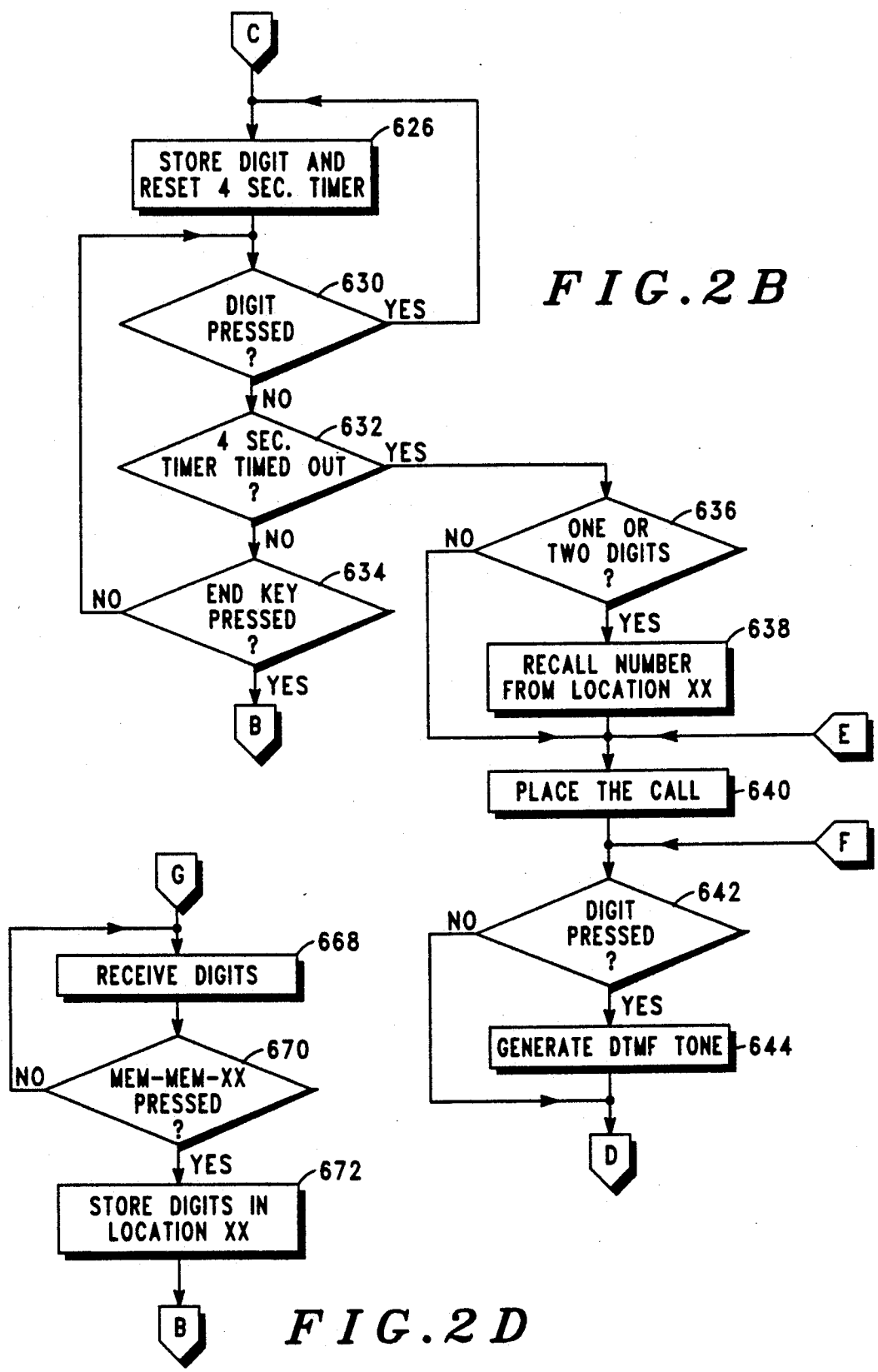

CELLULAR TELEPHONE WITH KEYPAD CONTROLLER

RELATED APPLICATIONS

The present invention is a continuation-in-part application based on copending U.S. patent application Ser. No. 07/622,201, filed Nov. 27, 1990, now U.S. Pat. No. 5,117,450 issued on May 26, 1992 assigned to the instant assignee, and incorporated herein by reference. U.S. patent application Ser. No. 07/622,201 is a continuation based on the instant assignee's U.S. patent application Ser. No. 07/369,419, filed Jun. 20, 1989 and now abandoned, which in turn is a continuation-in-part application based on the instant assignee's U.S. patent application Ser. No. 07/349,619, filed May 10, 1989 and now abandoned.

BACKGROUND OF THE INVENTION

The present invention is generally related to radiotelephones, and more particularly to a cellular telephone with a keypad controller.

Cellular telephones currently are operated with a special purpose handset having an integrated display, keypad, microphone and speaker, that is coupled via audio and data buses to a cellular telephone transceiver. Such special purpose handsets may not be miniaturized due to the integrated display, keypad, microphone and speaker, and their associated control circuitry. In order to avoid use of a cellular radio channel during dialing and minimize costs of cellular telephone calls, cellular telephone users are required to dial a telephone number and then press a "SEND" button (pre-origination dialing), in order to place a cellular telephone call. Pressing the "SEND" button causes the cellular telephone handset to generate a "SEND" signal and append it to the dialed digits transmitted to the cellular telephone transceiver. In contrast, conventional landline telephones place telephone calls automatically after a pause in dialing of several seconds. Such special purpose handsets also provide many different user features requiring complex software and additional circuitry. Thus, such special purpose handsets are both relatively large due to the integrated keypad, display, microphone and speaker, and relatively expensive due to the complex software and additional circuitry therein. Moreover, such special purpose handset does not operate like conventional landline telephones. For the foregoing reasons, there is a need for a cellular telephone with an inexpensive keypad controller which does not include a "SEND" button and integrated display.

SUMMARY OF THE INVENTION

The present invention encompasses cellular telephone apparatus having a plurality of operating modes and being operable on cellular radio channels, the cellular telephone apparatus comprising: a data bus having first and second ports; a cellular transceiver including a first microcomputer for controlling the operating modes and communicating cellular telephone calls on the cellular radio channels; a controller having a plurality of keys including ten numerical keys for entering telephone numbers and including a memory key for controlling the operating modes of the radiotelephone; a second microcomputer including a memory and coupled to the controller for detecting activations of individual keys to receive telephone number digits and concurrent activations of predetermined key sequences to select a corresponding one of the operating modes, respectively, the predetermined key sequences including the memory key and another key, the second microcomputer storing each received digit in the memory, and the second microcomputer further being coupled to the first port of the data bus for automatically transmitting the stored digits or the selected one of the operating modes to the cellular transceiver when the elapsed time from detection of the last activated key exceeds a predetermined time interval; and the first microcomputer coupled to the second port of the data bus for receiving the transmitted one of the operating modes and applying the received operating mode to the cellular transceiver, and receiving the transmitted digits and automatically transmitting the received digits on one of the cellular radio channels to originate a telephone call, whereby all dialed digits of each telephone number are automatically transmitted when dialing is interrupted for at least the predetermined time interval.

BRIEF DESCRIPTION OF THE DRAWINGS

FIG. 3 is a flow chart for the process used by microcomputer 508 in FIG. 1 for processing incoming telephone calls.

DESCRIPTION OF THE PREFERRED EMBODIMENT

Figure 1:
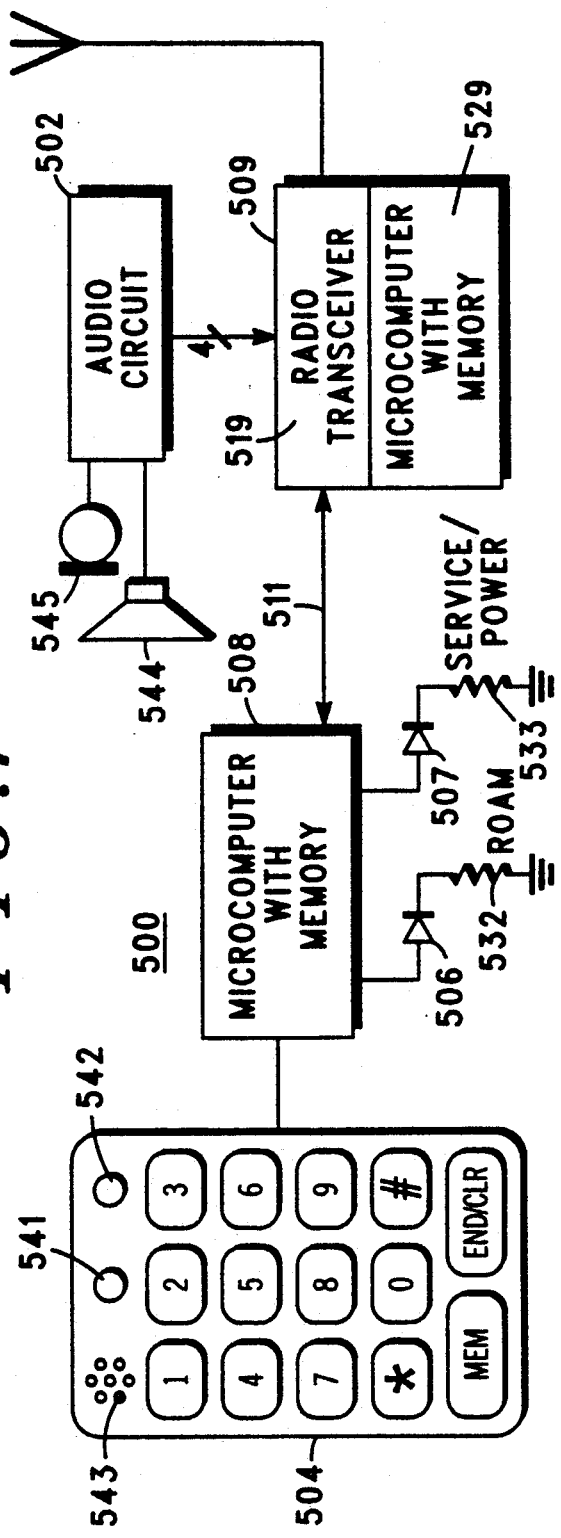
FIG. 1 is a block diagram of another cellular telephone 500 embodying the present invention, into which a keypad controller 504 may be plugged.

Referring to FIG. 1, there is illustrated a block diagram of another cellular telephone 500 embodying the present invention, into which a keypad controller 504 may be plugged. Cellular telephone 500 includes audio circuit 502, microcomputer 508, indicators 506 and 507, and cellular telephone transceiver 509. Note, however, that cellular telephone 500 does not include an information display as is typical of conventional cellular telephones, such as the cellular telephone. By utilizing the present invention, the need for an information display has been eliminated since cellular telephone 500 may be operated and controlled solely by utilizing controller 504 and its numerical keys 0–9, # and * and function keys MEM and END/CLEAR.

Audio circuit 502 of cellular telephone 500 couples speaker 544 to the radio receiver of, and microphone 545 to the radio transmitter of, radio transceiver 519. Microphone 545 is preferably disposed behind grill-type openings 543 in controller 504. Speaker 544 is not disposed in controller 504. Since controller 504 does not include a display or speaker 544, controller 504 is smaller and less complex than prior art telephone-type handsets.

Microcomputer 508 of cellular telephone 500 is coupled to numerical keys 0–9, # and * and to function keys MEM and END/CLEAR in controller 504, as well as to LED indicators 506 and 507 and their corresponding resistors 532 and 533. LED indicator 506 is lit in white color to indicate that cellular telephone 500 is in a ROAM operating mode, and LED indicator 507 is lit in red color to indicate that cellular telephone 500 is in the NO SERVICE operating mode or is lit in green color to indicate that cellular telephone 500 is in the POWER ON and HOME operating modes. LED indicator 506 is preferably positioned in opening 542 in controller 504, and LED indicator 507 is preferably positioned in opening 541 in controller 504.

Cellular telephone transceiver 509 includes a radio transceiver 519 and microcomputer 529 with memory therein for controlling the operation thereof. Cellular telephone transceiver 509 may be any conventional cellular telephone transceiver having a radio transmitter, radio receiver and logic unit, such as, for example, the conventional transceiver shown and described in Motorola instruction manual number 68P81066E40, entitled "DYNATAC Cellular Mobile Telephone 800 MHZ Transceiver," published by and available from Motorola C & E Parts, 1313 East Algonquin Road, Schaumburg, Ill. 60196. The operating modes of such conventional transceiver are described in Motorola user's manual number 68P81116E58, entitled "DYNA-TAC 6800XL Cellular Mobile Telephone USER'S MANUAL," published by and available from Motorola C & E Parts, 1313 East Algonquin Road, Schaumburg, Ill. 60196.

In the preferred embodiment, microcomputer 529 of cellular telephone transceiver 509 is coupled to microcomputer 508 by way of a three-wire data bus 511, which is illustrated and described in U.S. Pat. No. 4,369,516. Microcomputer 508 continuously looks for activated numerical and functions keys of controller 504. Each telephone number digit corresponding to an activated numerical key is detected and accumulated by microcomputer 508 in its memory. After a pause of four seconds, the accumulated digits are coded as described in the aforementioned U.S. Pat. No. 4,369,516 and transmitted by microcomputer 508 together with a SEND command via bus 511 to microcomputer 529. Microcomputer 529 receives the dialed digits from bus 511 and encodes and transmits them via the cellular radio channels by means of the radio transmitter of radio transceiver 519 for placing a cellular telephone call.

Key sequences of two or more concurrently activated function keys and/or numerical keys are also detected by microcomputer 508 for selecting operating modes of cellular telephone 500. The detected key sequences are coded into corresponding commands and transmitted via bus 511 to microcomputer 529. The operating modes of cellular telephone 500 include the power-on mode, power-off mode, telephone-number re-dial mode, telephone-number re-call mode, telephone-number store mode, lock mode, DTMF mode, hookswitch-flash mode, speaker-volume adjust mode, and call-privacy mode.

Figure 2C:
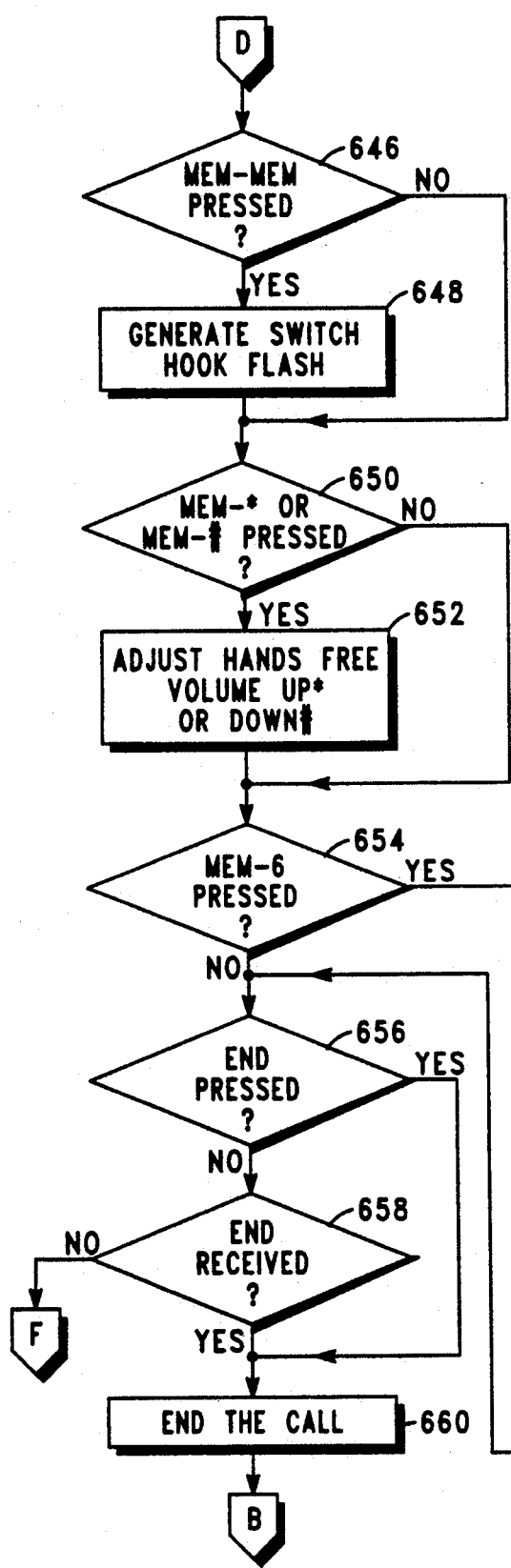
FIG. 2, comprised of FIGS. 2A, 2B, 2C, 2D and 2E, is a flow chart for the process used by microcomputer 508 in FIG. 1 for control and operation of cellular telephone 500 in response to the MEM key, END/CLEAR key, and digit keys of controller 504.
Figure 2E:
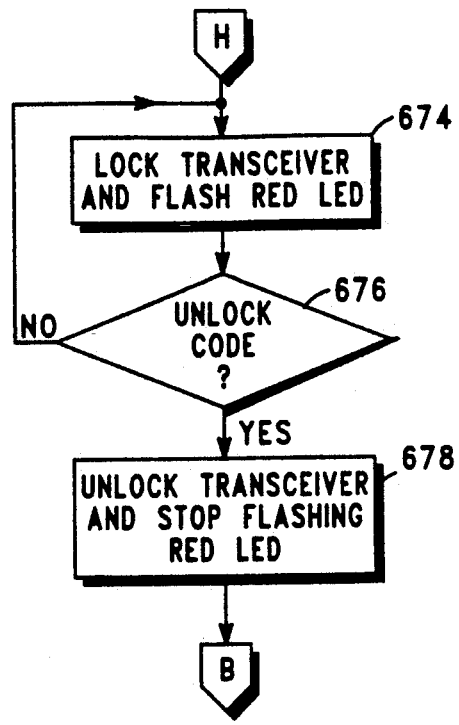

Referring next to FIG. 2, comprised of FIGS. 2A, 2B, 2C, 2D and 2E, there is illustrated a flow chart for the process used by microcomputer 508 in FIG. 1 for control and operation of cellular telephone 500 in response to the MEM key, END/CLEAR key, and numerical keys of controller 504. Entering at START block 602 in FIG. 2A, the process proceeds to decision block 604, where a check is made to determine if any two keys of controller 504 have been pressed. If not, NO branch is taken to wait. If two keys of controller 504 have been pressed, YES branch is taken from decision block 604 to block 606, where microcomputer 508 turns power on to cellular transceiver 519 and lights the green LED indicator 507. According to a feature of the present invention, the power-on mode is entered where the power is turned on to cellular transceiver 519 in response to concurrent activation of any two keys. Next, at block 608, a dial tone is generated by microcomputer 508 and applied to speaker 544.

Proceeding to decision block 610 in FIG. 2A, a check is made to determine if a MEM-END key sequence has been pressed. If so, YES branch is taken to block 612, where microcomputer 508 turns power off, and thereafter program control returns to other tasks at block 614. According to a feature of the present invention, power is turned on in response to concurrent activation of the MEM-END key sequence. If a MEM-END key sequence has not been pressed, NO branch is taken from decision block 610 to decision block 616, where a check is made to determine if a MEM-# key sequence has been pressed. According to a feature of the present invention, the telephone-number store mode is entered in response to concurrent activation of the MEM-# key sequence. If the MEM-# key sequence has been pressed, YES branch is taken from decision block 616 to exit point G to FIG. 2D, where, at block 668, microcomputer 508 receives each activated key as digits of a telephone number. Next, at decision block 670 in FIG. 2D, a chick is made to determine if a MEM-MEM-XX key sequence has been pressed, where XX represents two numerical keys 0-9. If not, NO branch is taken back to block 668 to receive another digit. If a MEM-MEM-XX key sequence has been pressed, YES branch is taken from decision block 670 to block 672, where the previously received digits are stored as a telephone number in the memory of microcomputer 508 at location XX. Thereafter program control exits at point B to return to block 608 and continue as described hereinabove.

Returning to decision block 616 in FIG. 2A, if a MEM-# key sequence has not been pressed, NO branch is taken to decision block 618, where a check is made to determine if a MEM-5 key sequence has been pressed. If so, YES branch is is taken to exit point H to FIG. 2E, where, at block 674, microcomputer 508 electronically locks cellular telephone transceiver 509 and flashes red LED indicator 506. According to a feature of the present invention, the lock mode is entered where cellular telephone transceiver 509 is electronically locked in response to concurrent activation of the MEM-5 key sequence. Next, at decision block 676 in FIG. 2E, a check is made to determine if a three-key unlock sequence has been pressed. If not, NO branch is taken back to block 674 to continue flashing red LED indicator 506. If the proper three-key unlock sequence has been pressed, YES branch is taken to block 678, where microcomputer 508 electronically unlocks cellular telephone transceiver 509 and stops flashing red LED indicator 506. Thereafter program control exits at point B to return to block 608 and continue as described hereinabove.

Returning to decision block 618 in FIG. 2A, if a MEM-5 key sequence has not been pressed, NO branch is taken to decision block 620, where a check is made to determine if a MEM-0 key sequence has been pressed. If so, YES branch is taken to block 622, microcomputer 508 recalls the last dialed telephone number from the scratch pad location in its memory and generates a beep in speaker 544 to advise the user. According to a feature of the present invention, the telephone number re-dial mode is entered where the last dialed telephone number is re-dialed in response to concurrent activation of the MEM-0 key sequence. Thereafter program control exits at point E to proceed to block 640 and continue as described hereinbelow. If a MEM-0 key sequence has not been pressed, NO branch is taken from decision block 620 to decision block 624, where a check is made to determine if a numerical key has been pressed. If not, NO branch is taken to decision block 610 to repeat the foregoing process.

If a numerical key has been pressed, YES branch is is taken from decision block 624 in FIG. 2A to exit point C to FIG. 2B, where, at block 626, microcomputer 508 stores the digit associated with the activated key in its memory and resets a four second timer. Next, at decision block 626 in FIG. 2B, a check is made to determine if another numerical key has been pressed. If so, YES branch is taken back to block 626 to store the associated digit in the memory of microcomputer 508 and reset the timer. If another numerical key has not been pressed, NO branch is taken from decision block 630 to decision block 632, where a check is made to determine if four second timer has timed out. If not, NO branch is taken to decision block 634, where a check is made to determine if the END key has been pressed. If so, YES branch is taken to exit at point B to return to block 608 and continue as described hereinabove. If the END key has not been pressed, NO branch is taken from decision block 634 back to decision block 630 to continue as described hereinabove.

In other embodiments, rather than store each digit at block 626, microcomputer 508 may instead code each digit immediately after detection and transmit the coded digit via bus 511 to microcomputer 529, where the received digits may be accumulated and automatically transmitted on the cellular radio channels four seconds after receipt of the last digit. This operation is illustrated and described in the instant assignee's aforementioned U.S. patent application Ser. No. 07/622,201, filed Nov. 27, 1990.

Returning to decision block 632 in FIG. 2B, if the four second timer has timed out, YES branch is taken to decision block 636, where a check is made to determine if only one or two digits have been dialed (except for "zero" which accesses the operator). If so, YES branch is is taken to block 638, where microcomputer 508 recalls the telephone number from the location X or XX in its memory and generates a beep in speaker 544 to advise the user. According to a feature of the present invention, the telephone-number re-call mode is entered where one or two-digit numbers cause telephone numbers stored at locations 1-99 to be speed dialed. Next, at block 640, microcomputer 508 places a telephone call to the dialed or recalled telephone number. At this point, the telephone number digits accumulated in the memory of microcomputer 508 or the recalled digits are coded and transmitted together with a SEND code by microcomputer 508 via bus 511 to microcomputer 529, where they are encoded and transmitted via the cellular radio channels by means of the radio transmitter of radio transceiver 519 for placing a cellular telephone call. Then, at decision block 642, a check is made to determine if another digit has been dialed. If so, YES branch is is taken to block 644, where microcomputer 508 generates the DTMF tone corresponding to the dialed digit. According to the feature of the present invention, the DTMF mode is entered where DTMF tones are generated in response to each digit dialed during a call.

From block 644 and NO branch of decision block 642 in FIG. 2B, program control exits at point D to FIG. 2C, where, at decision block 646, a check is made to determine if a MEM-MEM key sequence has been pressed. If so, YES branch is taken to block 648, where microcomputer 508 generates a hook switch flash. According to a feature of the present invention, the hook-switch-flash mode is entered where a hookswitch flash is generated in response to concurrent activation of the MEM-MEM key sequence during a call. From block 648 and NO branch of decision block 646, program control proceeds to decision block 650, where a check is made to determine if a MEM-* or a MEM-# key sequence has been pressed. If so, YES branch is taken to block 652, where microcomputer 508 changes the volume of speaker 544 up a predetermined amount for MEM-* key sequence or down predetermined amount for a MEM-# key sequence. According to a feature of the present invention, the speaker-volume adjust mode is entered where the volume of speaker 544 is adjusted up or down in response to concurrent activation of the MEM-* or MEM-# key sequence, respectively, during a call.

From block 652 and NO branch of decision block 650 in FIG. 2C, program control proceeds to decision block 654, where a check is made to determine if a MEM-6 key sequence has been pressed. If so, YES branch is taken back to block 662, where microcomputer 508 flashes the green LED indicator 507, mutes the microphone audio, and generates a beep in speaker 544 to advise the user. According to a feature of the present invention, the call-privacy mode is entered where audio from microphone 545 is muted for privacy in response to concurrent activation of the MEM-6 key sequence during a call. Next, at decision block 664 in FIG. 2C, a check is made to determine if a MEM-6 key sequence has been pressed again. If not, NO branch is taken to wait. If a MEM-6 key sequence has been pressed again, YES branch is taken to block 666, where where microcomputer 508 stops flashing the green LED indicator 507, unmutes the microphone audio, and generates two beeps in speaker 544 to advise the user.

From block 666 and NO branch of decision block 654 in FIG. 2C, program control proceeds to decision block 656, where a check is made to determine if the END key has been pressed. If not, NO branch is taken to decision block 658, where a check is made to determine if an END command has been received by cellular telephone transceiver 509. If not, NO branch is taken to exits at point F to return to decision block 642 and continue as described hereinabove. If the END key has been pressed or if an END command has been received by cellular telephone transceiver 509, YES branch is taken from decision blocks 656 or 658, respectively, to block 660 to end the current call. Thereafter, program control exits at point B to return to block 608 and continue as described hereinabove.

Referring next to FIG. 3, there is illustrated a flow chart for the process used by microcomputer 508 in FIG. 1 for processing incoming telephone calls. Entering at START block 702, the process proceeds to decision block 704, where a check is made to determine if an incoming call has been received. If not, NO branch is taken to wait. If an incoming call has been received, YES branch is taken from decision block 704 to block 706, where microcomputer 508 generates a an electronic ringing signal 116 which is applied to speaker 544. Next, at decision block 708, a check of the keys of controller 504 is made to determine if any key has been pressed. If not, NO branch is taken to wait. According to a feature of the present invention, an incoming call is answered in response to activation of any key. If a key of controller 504 has been pressed, YES branch is taken from decision block 708 to block 710 to connect the call and thereafter proceed to entry point F in FIG. 2B to continue as described hereinabove.

In summary, a unique cellular telephone includes a keypad controller for controlling the operating modes thereof and automatically placing and receiving cellular telephone calls dialed in any pattern. The novel keypad controller includes numerical keys 0–9, # and * and function keys MEM and END/CLEAR, and does not require an information display as in prior art cellular telephone handsets. The dialed digits of a telephone number are stored and automatically transmitted in response to a four second pause by the unique cellular telephone of the present invention for placement of a cellular telephone call without using a "SEND" button.

We claim:

1. Cellular telephone apparatus having a plurality of operating modes and being operable on cellular radio channels, and cellular telephone apparatus comprising:
    a data bus having first and second ports;
    a transceiver including a first microcomputer for controlling the operating modes and communicating cellular telephone calls on the cellular radio channels;
    a controller having a plurality of keys including ten numerical keys for entering telephone numbers and including a memory key for controlling the operating modes of the cellular telephone apparatus;
    a second microcomputer including a memory and being coupled to the controller for detecting activations of individual keys to receive telephone number digits and for detecting concurrent activations of predetermined key sequences to select a corresponding one of the operating modes, the predetermined key sequences including the memory key and another key, said second microcomputer storing each received digit in the memory, and said second microcomputer further being coupled to the first port of said data bus for automatically transmitting the stored digits or the selected one of the operating modes to the cellular transceiver when the elapsed time from detection of the last activated key exceeds a predetermined time interval; and
    said first microcomputer coupled to the second port of said data bus for receiving the selected one of the operating modes and applying the received operating mode to the cellular transceiver, and receiving the transmitted digits and automatically transmitting the received digits on one of the cellular radio channels to originate a telephone call, whereby all dialed digits of each telephone number are automatically transmitted when dialing is interrupted for at least the predetermined time interval.

2. The cellular telephone apparatus according to claim 1, wherein said second microcomputer is responsive for concurrent activation of any two keys for applying power to said cellular transceiver.

3. The cellular telephone apparatus according to claim 2, wherein said cellular telephone further includes an indicator coupled to the second microcomputer for providing a visual indication when power is on.

4. The cellular telephone apparatus according to claim 3, wherein said indicator is a light emitting diode.

5. The cellular telephone apparatus according to claim 2, wherein said controller further includes and end key and said second microcomputer is responsive to concurrent activation of the memory key and the end key for removing power from said cellular transceiver.

6. Cellular telephone apparatus having a plurality of operating modes, said cellular telephone apparatus comprising:
    a data bus having first and second ports;
    a cellular transceiver including a first microcomputer and being operable on the cellular radio channels for communicating cellular telephone calls;
    a controller having a plurality of keys including ten numerical keys for entering telephone numbers and including a memory key for controlling the operating modes of the cellular telephone apparatus;
    a second microcomputer including a memory and being coupled to the controller for detecting activations of individual keys to receive telephone number digits and for detecting concurrent activations of predetermined key sequences to select a corresponding one of the operating modes, the predetermined key sequences including the memory key and another key, said second microcomputer validating and storing each received digit in the memory, and said second microcomputer further being coupled to the first port of said data bus for automatically transmitting the stored digits or the selected one of the operating modes to the cellular transceiver when the elapsed time from detection of the last activated key exceeds a predetermined time interval; and
    said first microcomputer coupled to the second port of said data bus for receiving the selected one of the operating modes and applying the received operating mode to the cellular transceiver, and receiving the transmitted digits and automatically transmitting the received digits on one of the cellular radio channels to originate a telephone call, whereby all dialed digits of each telephone number are automatically transmitted when dialing is interrupted for at least the predetermined time interval.

7. The cellular telephone apparatus according to claim 6, wherein said second microcomputer is responsive for concurrent activation of any two keys for applying power to said cellular transceiver.

8. The cellular telephone apparatus according to claim 7, wherein said cellular telephone further includes an indicator coupled to the second microcomputer for providing a visual indication when power is on.

9. The cellular telephone apparatus according to claim 8, wherein said indicator is a light emitting diode.

10. The cellular telephone apparatus according to claim 7, wherein said controller further includes an end key and said second microcomputer is responsive to concurrent activation of the memory key and the end key for removing power from said cellular transceiver.

11. A method of operating a radiotelephone having a plurality of operating modes, the radiotelephone including a controller coupled by a microcomputer with a memory to a cellular transceiver, the cellular transceiver being operable on cellular radio channels for communicating cellular telephone calls, and the controller including ten numerical keys for entering telephone numbers and including a memory key and an end key for controlling the operating modes of the radiotelephone, said method comprising the steps of:
    detecting concurrent activation of at least two keys to select a power-on mode and applying power to said cellular transceiver;

detecting activations of individual keys and concurrent activations of predetermined key sequences to receive telephone number digits and to select a corresponding one of the operating modes, respectively, the predetermined key sequences including the memory key and another key;

storing each received telephone number digit in the memory;

automatically transmitting all of the stored telephone number digits on one of the cellular radio channels when the elapsed time from detection of the last activated key exceeds a predetermined time interval to originate a telephone call; and ending a telephone call when activation of the end key is detected.

12. The method according to claim 11, further including the step of enabling an indicator during the power-on mode.

13. The method according to claim 12, further including the step of detecting concurrent activation of the memory and the end key to select a power-down mode, said method including the step of removing power from said cellular transceiver when the power-down mode is selected.

14. The method according to claim 11, wherein the predetermined key sequences include a memory key followed by a first predetermined numerical key for selecting a re-dial mode, said method further including the step of re-transmitting the previously transmitted telephone number digits when the re-dial mode is selected.

15. The method according to claim 11, wherein the predetermined key sequences include a memory key followed by a second predetermined numerical key for selecting the lock mode, said method further including the step of electronically locking the cellular transceiver when the lock mode is selected.

* * * * *